(12) United States Patent
Tejima

(10) Patent No.: US 10,720,650 B2
(45) Date of Patent: Jul. 21, 2020

(54) FUEL CELL AND MOVING BODY

(71) Applicant: TOYOTA JIDOSHA KABUSHIKI KAISHA, Toyota-shi, Aichi-ken (JP)

(72) Inventor: Go Tejima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/412,755

(22) Filed: May 15, 2019

(65) Prior Publication Data

US 2019/0267637 A1 Aug. 29, 2019

Related U.S. Application Data

(62) Division of application No. 14/861,256, filed on Sep. 22, 2015, now abandoned.

(30) Foreign Application Priority Data

Sep. 25, 2014 (JP) .................................. 2014-195812

(51) Int. Cl.
*H01M 4/90* (2006.01)
*H01M 4/92* (2006.01)
*H01M 8/1032* (2016.01)
*H01M 4/86* (2006.01)

(52) U.S. Cl.
CPC ....... *H01M 4/9083* (2013.01); *H01M 4/8663* (2013.01); *H01M 4/921* (2013.01); *H01M 8/1032* (2013.01); *H01M 2250/20* (2013.01); *Y02E 60/521* (2013.01); *Y02T 90/32* (2013.01)

(58) Field of Classification Search
None
See application file for complete search history.

(56) References Cited

U.S. PATENT DOCUMENTS

| 2003/0072990 A1* | 4/2003 | Sugawara | H01M 4/881 429/481 |
| 2004/0175326 A1* | 9/2004 | Hershkowitz | B01J 19/2485 423/652 |
| 2009/0075147 A1* | 3/2009 | Kitamura | C08G 65/40 429/493 |

FOREIGN PATENT DOCUMENTS

| JP | 2003-115299 A | 4/2003 |
| JP | 2007-080694 A | 3/2007 |
| JP | 2011-258452 | 12/2011 |
| JP | 2013-89447 | 5/2013 |
| JP | 2013-143340 | 7/2013 |
| WO | WO2013/057563 A1 | 4/2013 |

OTHER PUBLICATIONS

U.S. Appl. No. 14/861,256, filed Sep. 22, 2015.

* cited by examiner

*Primary Examiner* — Wyatt P McConnell
(74) *Attorney, Agent, or Firm* — Finnegan, Henderson, Farabow, Garrett & Dunner, LLP

(57) ABSTRACT

A fuel cell includes a catalyst layer containing a polymer electrolyte and catalyst-carrying carbon. A value of an initial weight ratio of the polymer electrolyte to the catalyst-carrying carbon in the catalyst layer is set to a value that is smaller by 0.1 to 0.2 than a value of a weight ratio of the polymer electrolyte to the catalyst-carrying carbon in the catalyst layer which maximizes a maximum output of the fuel cell in a state where the polymer electrolyte is not swollen.

5 Claims, 5 Drawing Sheets

A fuel cell and moving body.

FUEL CELL AND MOVING BODY

INCORPORATION BY REFERENCE

This is a divisional of U.S. application Ser. No. 14/861,256, filed on Sep. 22, 2015, which claims priority based on Japanese Patent Application No. 2014-195812, filed on Sep. 25, 2014, the disclosure of each of which is incorporated by reference herein in its entirety.

BACKGROUND OF THE INVENTION

1. Field of the Invention

The invention relates to a fuel cell and a moving body.

2. Description of Related Art

Unit cells of a fuel cell installed in a fuel cell vehicle or the like each include an anode electrode and a cathode electrode on both sides of an electrolyte membrane and each electrode includes a catalyst layer for promoting an electrochemical reaction in the unit cell. The catalyst layer contains catalyst-carrying carbon carrying a catalyst such as platinum, and a polymer electrolyte (ionomer) serving to conduct protons or oxygen (see Japanese Patent Application Publication No. 2011-258452 (JP 2011-258452 A), Japanese Patent Application Publication No. 2013-143340 (JP 2013-143340 A), and Japanese Patent Application Publication No. 2013-089447 (JP 2013-089447 A)).

In the meantime, the weight ratio (I/C) of the polymer electrolyte (I) to the catalyst-carrying carbon (C) in the catalyst layer significantly affects the performance of the fuel cell such as the maximum output of the fuel cell and thus is set to a predetermined value in the manufacture of the unit cells. In general, the weight ratio (I/C) at the initial time (at the time of the manufacture) is set so that the initial performance of the fuel cell becomes maximum. Specifically, as shown in FIG. 5, a value $P_0$ of the weight ratio (I/C) which maximizes the maximum output of the fuel cell is selected in a characteristic curve $S_0$ showing the correlation between a weight ratio (I/C) and a maximum output of the fuel cell in an initial state (swelling ratio: 0%).

However, during the use of the fuel cell, the polymer electrolyte of the catalyst layer contains water and swells irreversibly. By this swelling, as shown in FIG. 5, the characteristic curve between the weight ratio (I/C) and the maximum output of the fuel cell changes so that as the swelling ratio increases, the peak of the maximum output of the fuel cell moves toward the lower weight ratio (I/C) side and the maximum output of the fuel cell decreases. Further, the carbon of the catalyst-carrying carbon is oxidized and disappears during the use of the fuel cell, resulting in a reduction in the amount of the carbon, so that the value of the weight ratio (I/C) increases gradually. This also causes a reduction in the maximum output of the fuel cell.

As a result, if the initial weight ratio (I/C) is set to the value $P_0$ which maximizes the initial performance of the fuel cell as described above, there is a possibility that the performance of the fuel cell decreases by continuing the use of the fuel cell, for example, as indicated by arrows in FIG. 5.

SUMMARY OF THE INVENTION

One aspect of the present application provides a fuel cell that can suppress a reduction in the performance of the fuel cell due to its use, and further provides a moving body having such a fuel cell.

One aspect of the invention includes a fuel cell including a catalyst layer containing a polymer electrolyte and catalyst-carrying carbon, wherein a value of an initial weight ratio of the polymer electrolyte to the catalyst-carrying carbon in the catalyst layer is a value that is smaller by 0.1 to 0.2 than a value of a weight ratio of the polymer electrolyte to the catalyst-carrying carbon in the catalyst layer which maximizes a maximum output of the fuel cell in a state where the polymer electrolyte is not swollen.

According to the invention, it is possible to suppress a reduction in the performance of the fuel cell even when the polymer electrolyte of the catalyst layer is swollen irreversibly during the use of the fuel cell or even when the carbon of the catalyst-carrying carbon of the catalyst layer is oxidized and disappears during the use of the fuel cell, resulting in a reduction in the amount of the carbon.

In the fuel cell, the polymer electrolyte may be at least one of a perfluorocarbonsulfonic acid polymer and a polyarylene ether sulfonic acid copolymer.

In the fuel cell, the catalyst-carrying carbon may be a carbon black.

In the fuel cell, the catalyst-carrying carbon may carry at least one metal catalyst selected from Pt, Pt—Fe, Pt—Cr, Pt—Ni, and Pt—Ru.

Another aspect of the invention includes a moving body having the above-described fuel cell.

According to the one aspect of the invention, since the reduction in the performance of the fuel cell due to its use can be suppressed, the durability of the fuel cell is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
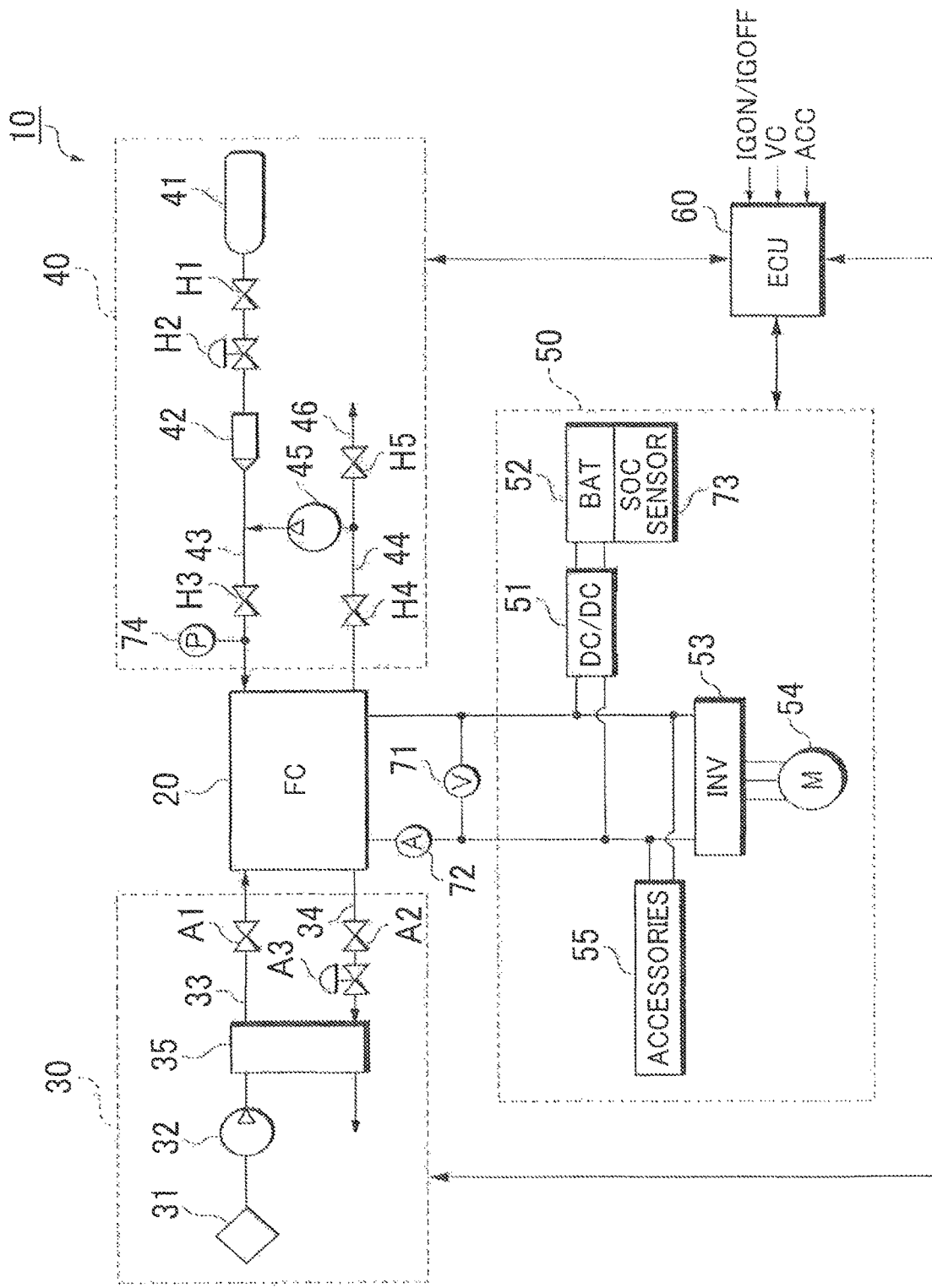
FIG. 1 is an explanatory diagram showing a schematic configuration of a fuel cell system.

Hereinbelow, an embodiment of the invention will be described in detail. Unless otherwise specified, the positional relationship such as upper, lower, left, and right is based on the positional relationship shown in the drawings. The dimensional ratios are not limited to those shown in the drawings. Further, the following embodiment is for illustrative purposes only and is not intended to limit the invention in any aspect. Further, the invention can be variously modified in a range not departing from its gist.

FIG. 1 shows a system configuration of a fuel cell system 10 in this embodiment. The fuel cell system 10 serves as, for example, an in-vehicle power supply system installed in a fuel cell vehicle as a moving body and includes a fuel cell 20 which is supplied with reactive gases (a fuel gas and an oxidant gas) and generates electric power, an oxidant gas supply system 30 for supplying the air as an oxidant gas to the fuel cell 20, a fuel gas supply system 40 for supplying a hydrogen gas as a fuel gas to the fuel cell 20, a power system 50 for controlling charge and discharge of electric power, and a controller 60 which totally controls the entire system.

The fuel cell 20 is a solid polymer electrolyte type cell stack formed by stacking a number of cells in series. In the fuel cell 20, an oxidation reaction of Formula (1) occurs at the anode, while a reduction reaction of Formula (2) occurs at the cathode. An electromotive reaction of Formula (3) occurs in the fuel cell 20 as a whole.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

Figure 2:
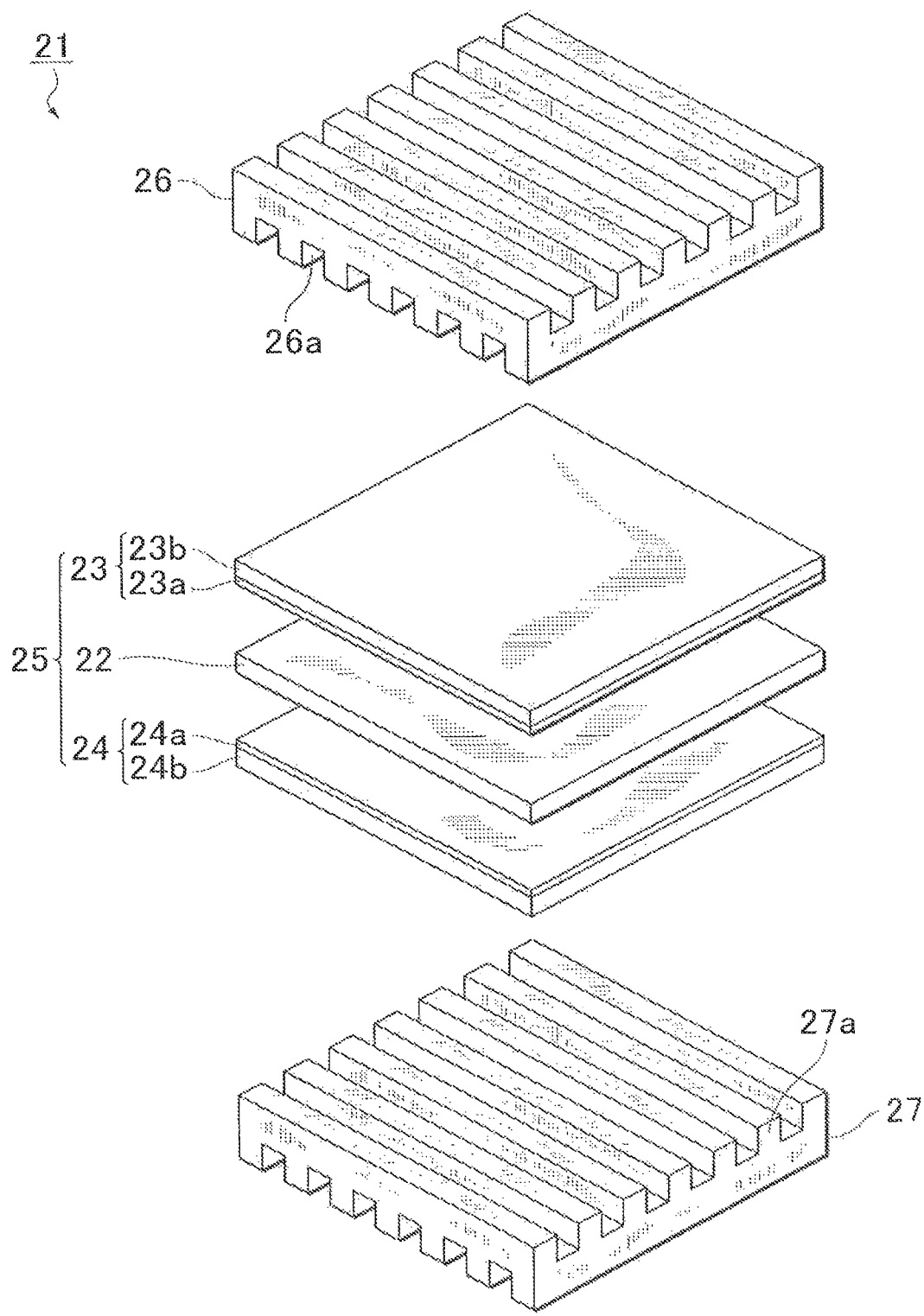
FIG. 2 is an explanatory diagram showing a cell structure of a fuel cell.

FIG. 2 is an exploded perspective view of a cell 21 constituting the fuel cell 20. The cell 21 includes a polymer electrolyte membrane 22, an anode electrode 23, a cathode electrode 24, and separators 26 and 27. The anode electrode 23 and the cathode electrode 24 sandwich the polymer electrolyte membrane 22 therebetween from both sides, thereby forming a sandwich structure.

The separators 26 and 27 are each formed by a gas-impermeable conductive member and sandwich the anode electrode 23 and the cathode electrode 24 therebetween from both sides, thereby forming fuel gas flow paths between the separator 26 and the anode electrode 23 and oxidant gas flow paths between the separator 27 and the cathode electrode 24.

The separator 26 is formed with ribs 26a recessed in cross section. The anode electrode 23 is in abutment with the ribs 26a to close opening portions of the ribs 26a so that the fuel gas flow paths are formed. The separator 27 is formed with ribs 27a recessed in cross section. The cathode electrode 24 is in abutment with the ribs 27a to close opening portions of the ribs 27a so that the oxidant gas flow paths are formed.

Figure 3:
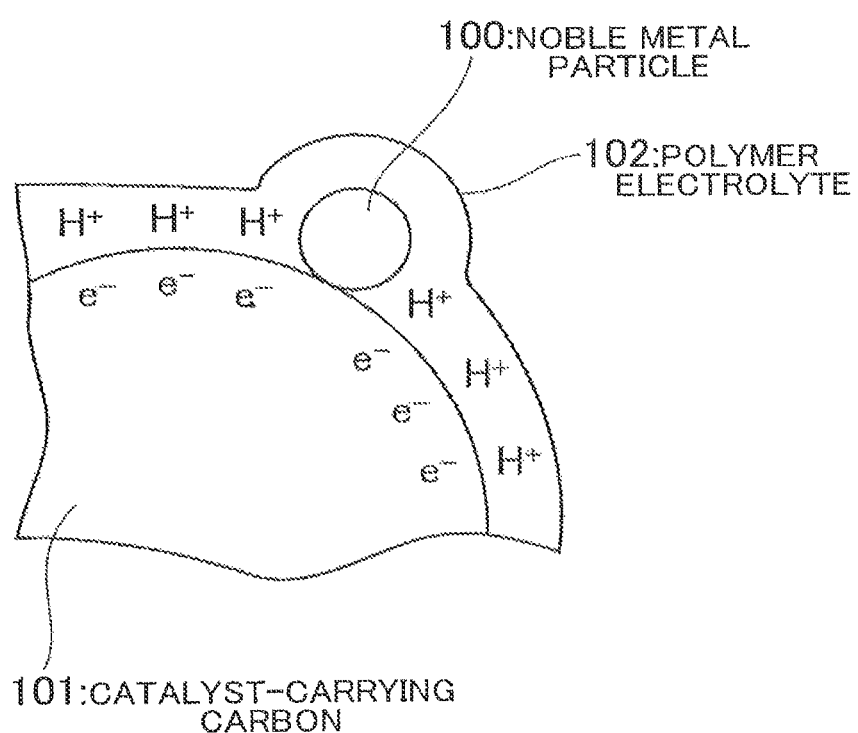
FIG. 3 is an explanatory diagram exemplarily showing a polymer electrolyte and catalyst-carrying carbon in a catalyst layer.

The anode electrode 23 includes a catalyst layer 23a and a gas diffusion layer 23b. Likewise, the cathode electrode 24 includes a catalyst layer 24a and a gas diffusion layer 24b. As shown in FIG. 3, the catalyst layers 23a and 24a each contain catalyst-carrying carbon 101 carrying, for example, platinum-based noble metal particles 100 serving as a catalyst, and a polymer electrolyte 102.

As a platinum-based material of the noble metal particles 100, it is possible to use, for example, a metal catalyst (Pt, Pt—Fe, Pt—Cr, Pt—Ni, Pt—Ru, or the like). As the catalyst-carrying carbon 101, it is possible to use, for example, a carbon black.

As the polymer electrolyte 102, it is possible to use, for example, a proton-conductive ion exchange resin or the like containing a perfluorocarbonsulfonic acid polymer being a fluorine-based resin, BPSH (polyarylene ether sulfonic acid copolymer) being a non-fluorine-based resin, or the like. The perfluorocarbonsulfonic acid polymer and BPSH each contain a sulfonic acid group. That is, these resins have ionicity and are also called "ionomer (ion+polymer)".

The catalyst layer 23a, 24a is formed by adding a predetermined amount of the polymer electrolyte 102 to a predetermined amount of the catalyst-carrying carbon 101 carrying the noble metal particles 100, then forming them into a paste, and then screen-printing the paste on the polymer electrolyte membrane 22. The catalyst layer 23a, 24a may be formed using another method such as spray coating.

Figure 4:
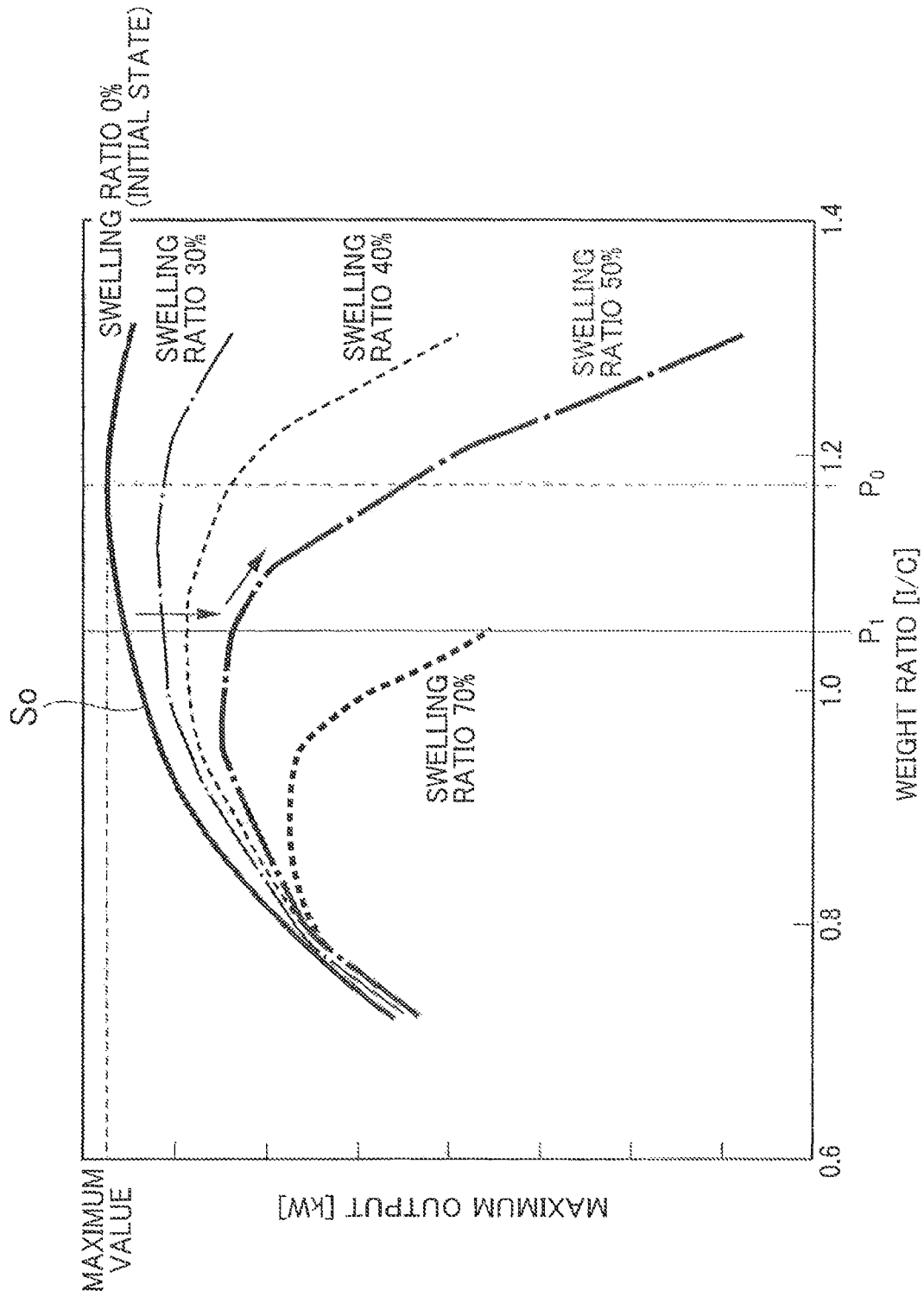
FIG. 4 is a graph showing the correlation between a weight ratio (I/C) and a maximum output of a fuel cell.
Figure 5:
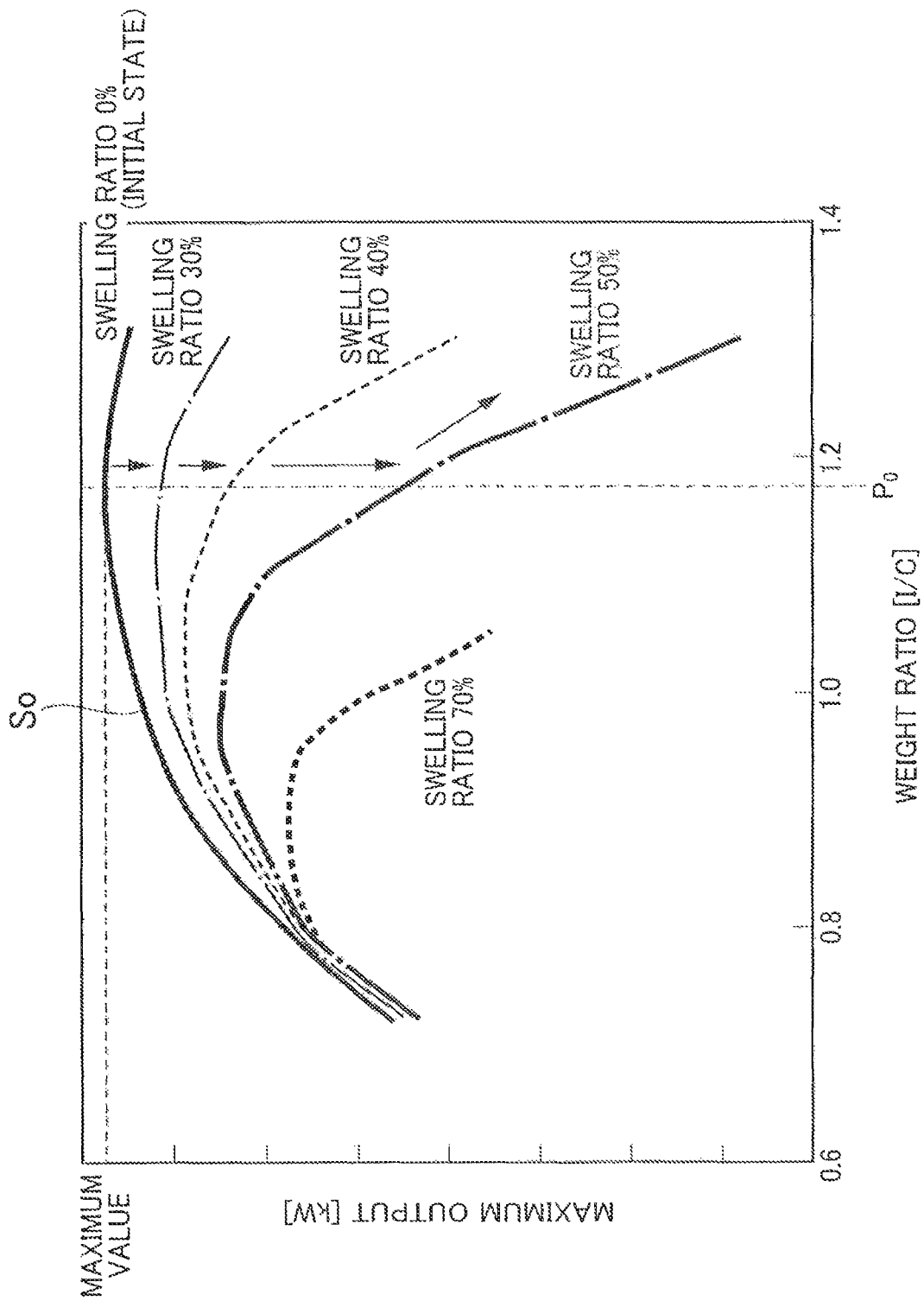
FIG. 5 is a graph showing a general setting value of an initial weight ratio (I/C).

In this embodiment, a value $P_1$ of a weight ratio (I/C) (a value obtained by dividing the weight of the polymer electrolyte 102 by the weight of the catalyst-carrying carbon 101 (including the weight of the noble metal particles 100)) of the polymer electrolyte 102 to the catalyst-carrying carbon 101 in the catalyst layer 23a, 24a at an initial time (at the time of the manufacture) is set to a predetermined value. Specifically, as shown in FIG. 4, the value of the initial weight ratio (I/C) is set to a value that is smaller by 0.1 to 0.2 than a value $P_0$ of a weight ratio (I/C) which maximizes the maximum output of the fuel cell in a state where the polymer electrolyte 102 is not swollen (initial state). A characteristic curve $S_0$, shown in FIG. 4, showing the correlation between a maximum output of the fuel cell and a weight ratio (I/C) in the initial state is obtained in advance by experiment, calculation, or the like.

The gas diffusion layer 23b, 24b is formed by carbon cloth, carbon paper, or carbon felt formed on a surface of the catalyst layer 23a, 24a, having gas permeability and electron conductivity, and woven with yarn made of carbon fibers.

The polymer electrolyte membrane 22 shown in FIG. 2 is a proton-conductive ion exchange membrane made of a solid polymer material such as a fluorine-based resin and exhibits excellent electrical conductivity in a wet state. A membrane-electrode assembly 25 is formed by the polymer electrolyte membrane 22, the anode electrode 23, and the cathode electrode 24.

As shown in FIG. 1, the fuel cell 20 is provided with a voltage sensor 71 for detecting an output voltage of the fuel cell 20 (FC voltage) and a current sensor 72 for detecting an output current of the fuel cell 20 (FC current).

The oxidant gas supply system 30 includes an oxidant gas path 33 in which an oxidant gas to be supplied to the cathode electrodes 24 of the fuel cell 20 flows, and an oxidant off-gas path 34 in which an oxidant off-gas discharged from the fuel cell 20 flows. The oxidant gas path 33 is provided with an air compressor 32 for introducing the oxidant gas from the atmosphere through a filter 31, a humidifier 35 for humidifying the oxidant gas compressed by the air compressor 32, and a cutoff valve A1 for cutting off the supply of the oxidant gas to the fuel cell 20.

The oxidant off-gas path 34 is provided with a cutoff valve A2 for cutting off the discharge of the oxidant off-gas from the fuel cell 20, a back pressure regulating valve A3 for regulating the supply pressure of the oxidant gas, and the humidifier 35 for performing moisture exchange between the oxidant gas (dry gas) and the oxidant off-gas (wet gas).

The fuel gas supply system 40 includes a fuel gas supply source 41, a fuel gas path 43 in which a fuel gas to be supplied to the anode electrodes 23 of the fuel cell 20 from the fuel gas supply source 41 flows, a circulation path 44 for returning a fuel off-gas, discharged from the fuel cell 20, to the fuel gas path 43, a circulation pump 45 for sending under pressure the fuel off-gas in the circulation path 44 to the fuel gas path 43, and an exhaust/drain path 46 branching off from the circulation path 44.

The fuel gas supply source 41 is formed by, for example, a high-pressure hydrogen tank or a hydrogen absorbing alloy and stores a hydrogen gas at a high pressure (e.g. 35 MPa to 70 MPa). When a cutoff valve H1 is opened, the fuel gas flows out to the fuel gas path 43 from the fuel gas supply source 41. The pressure of the fuel gas is reduced to, for example, about 200 kPa by a regulator H2 and an injector 42 and then the fuel gas is supplied to the fuel cell 20.

The circulation path 44 is connected to a cutoff valve H4 for cutting off the discharge of the fuel off-gas from the fuel cell 20 and to the exhaust/drain path 46 branching off from the circulation path 44. An exhaust/drain valve H5 is disposed in the exhaust/drain path 46. The exhaust/drain valve H5 is actuated by a command from the controller 60, thereby discharging (purging) the fuel off-gas containing impurities and water in the circulation path 44 to the outside.

The fuel off-gas discharged through the exhaust/drain valve H5 is mixed with the oxidant off-gas flowing through the oxidant off-gas path 34 and is diluted by a diluter (not shown). The circulation pump 45 is driven by a motor to circulate the fuel off-gas in the circulation system to the fuel cell 20.

The power system 50 includes a DC/DC converter 51, a battery (electric power storage device) 52, a traction inverter 53, a traction motor 54, and accessories 55. The DC/DC converter 51 has a function of increasing a DC voltage supplied from the battery 52 and outputting the increased voltage to the traction inverter 53 and a function of reducing the voltage of DC power generated by the fuel cell 20 or the voltage of regenerative electric power collected by the traction motor 54 which results from regenerative braking, and charging the battery 52 with the power obtained.

The battery 52 serves as a storage source of excess electric power, a storage source of regenerative energy at the time of regenerative braking, or an energy buffer at the time of a change in load resulting from acceleration or deceleration of the fuel cell vehicle. The battery 52 is preferably, for example, a secondary battery such as a nickel-cadmium storage battery, a nickel-hydrogen storage battery, or a lithium secondary battery. An SOC (State of Charge) sensor 73 is attached to the battery 52 for detecting SOC, i.e. the remaining capacity, of the battery 52.

The traction inverter 53 is, for example, a PWM inverter driven by pulse width modulation and controls the rotation torque of the traction motor 54 by converting a DC voltage output from the fuel cell 20 or the battery 52 into a three-phase AC voltage according to a control command from the controller 60. The traction motor 54 is, for example, a three-phase AC motor and constitutes a power source of the fuel cell vehicle.

The accessories 55 collectively refer to motors disposed at respective portions in the fuel cell system 10 (e.g. power sources of the pumps), inverters for driving these motors, and various in-vehicle accessories (e.g. air compressor, injector, cooling water circulation pump, radiator, etc.).

The controller 60 is a computer system including a CPU, a ROM, a RAM, and input/output interfaces and controls respective portions of the fuel cell system 10. For example, in response to receipt of a start signal IG output from an ignition switch, the controller 60 starts the operation of the fuel cell system 10 and obtains electric power required for the entire system based on an accelerator opening degree signal ACC output from an accelerator sensor, a vehicle speed signal VC output from a vehicle speed sensor, and so on. The electric power required for the entire system is the sum of electric power for the travel of the vehicle and electric power for the accessories.

The electric power for the accessories includes electric power consumed by in-vehicle accessories (humidifier, air compressor, hydrogen pump, cooling water circulation pump, etc.), electric power consumed by apparatuses which are required for the travel of the vehicle (transmission, vehicle wheel control apparatus, steering apparatus, suspension, etc.), electric power consumed by apparatuses disposed in a passenger space (air conditioner, lighting equipment, audio system, etc.), and so on.

The controller 60 determines distribution between electric power output from the fuel cell 20 and electric power output from the battery 52 and controls the oxidant gas supply system 30 and the fuel gas supply system 40 so that the amount of electric power generated by the fuel cell 20 agrees with a target electric power. The controller 60 further controls the DC/DC converter 51 to adjust the output voltage of the fuel cell 20, thereby controlling the operating point (output voltage and output current) of the fuel cell 20.

During the operation of the fuel cell system 10, in the fuel cell 20, hydrogen ions generated at the anode electrode 23 as expressed by Formula (1) given above pass through the polymer electrolyte membrane 22 and move to the cathode electrode 24 and, as expressed by Formula (2) given above, the hydrogen ions moved to the cathode electrode 24 produce an electrochemical reaction with oxygen in the oxidant gas supplied to the cathode electrode 24, thereby causing a reduction reaction of the oxygen to produce water.

In this event, in the catalyst layer 23$a$, 24$a$, the polymer electrolyte 102 contains water and swells irreversibly. By this swelling, as shown in FIG. 4, the characteristic curve between the weight ratio (I/C) of the polymer electrolyte 102 to the catalyst-carrying carbon 101 and the maximum output of the fuel cell changes so that as the swelling ratio increases, the peak of the maximum output of the fuel cell moves toward the lower weight ratio (I/C) side and the maximum output of the fuel cell decreases. This is because while oxygen is required to transmit through the polymer electrolyte 102 in order to reach the catalyst, when the polymer electrolyte 102 is swollen, the path for this transmission becomes longer so that it is made harder for the oxygen to reach the catalyst.

Further, since the carbon is oxidized and disappears in the catalyst-carrying carbon 101, the value of the weight ratio (I/C) increases. Varying electric potentials are applied to the carbon of the catalyst-carrying carbon 101 and, due to such electric potentials, the carbon of the catalyst-carrying carbon 101 reacts with water to be oxidized as expressed by Formula (4).

$$C + 2H_2O \rightarrow CO_2 + 4H^+ + 4e^- \qquad (4)$$

According to this embodiment, as shown in FIG. 4, the value $P_1$ of the initial weight ratio (I/C) of the polymer electrolyte 102 to the catalyst-carrying carbon 101 in the catalyst layer 23$a$, 24$a$ is set to the value that is smaller by 0.1 to 0.2 than the value $P_0$ of the weight ratio (I/C) which maximizes the maximum output of the fuel cell in the state where the polymer electrolyte 102 is not swollen. Therefore, it is possible to suppress a reduction in the performance of the fuel cell 20 even when the polymer electrolyte 102 is swollen irreversibly during the use of the fuel cell 20 or even when the carbon of the catalyst-carrying carbon 101 is oxidized and disappears during the use of the fuel cell 20, resulting in a reduction in the amount of the carbon.

If the value $P_1$ of the initial weight ratio (I/C) of the polymer electrolyte 102 to the catalyst-carrying carbon 101 is set to a value that is smaller by a value less than 0.1 than the value $P_0$ of the weight ratio (I/C) which maximizes the maximum output of the fuel cell in the state where the polymer electrolyte 102 is not swollen, the effect of suppressing a reduction in the performance of the fuel cell is small. On the other hand, if the value $P_1$ of the initial weight ratio (I/C) is set to a value that is smaller by a value greater than 0.2 than the value $P_0$ of the weight ratio (I/C) which maximizes the maximum output of the fuel cell, the initial performance becomes too low, which is thus not preferable.

While the preferred embodiment of the invention has been described with reference to the accompanying drawings, the invention is not limited thereto. It is apparent that those skilled in the art can think of various changes and modifications in the category of ideas described in the claims and it is understood that those also naturally belong to the technical scope of the invention. It is understood to those skilled in the art that the invention is established even when there is no limitation to a material of the polymer electrolyte, the catalyst-carrying carbon, or the metal catalyst, in other words, even when there is no material specified in a dependent claim.

For example, in the embodiment described above, the example is shown in which the fuel cell 20 is installed in the fuel cell vehicle, but the fuel cell according to the invention can also be installed in various moving bodies (robot, ship, airplane, etc.) other than the fuel cell vehicle. Alternatively, the fuel cell 20 may be applied to a stationary power generating system which is used as a power generating facility for constructions (house, building, etc.).

The invention is useful for suppressing a reduction in the performance of a fuel cell due to its use.

What is claimed is:

1. A method for suppressing a reduction in performance of a fuel cell, the fuel cell including a catalyst layer containing a polymer electrolyte and catalyst-carrying carbon, the method comprising setting a value of a weight ratio of the polymer electrolyte to the catalyst-carrying carbon in the catalyst layer at a time of manufacture to a value that is in a range of 0.6 to 1.4, wherein the value of the weight ratio is set using a characteristic curve showing a correlation between a maximum output of the fuel cell and a weight ratio in an initial state, said characteristic curve being obtained in advance; and using the fuel cell.

2. The method according to claim 1, wherein the polymer electrolyte is at least one of a perfluorocarbonsulfonic acid polymer and a polyarylene ether sulfonic acid copolymer.

3. The method according to claim 1, wherein the catalyst-carrying carbon is a carbon black.

4. The method according to claim 1, wherein the catalyst-carrying carbon carries at least one metal catalyst selected from Pt, Pt—Fe, Pt—Cr, Pt—Ni, and Pt—Ru.

5. The method according to claim 1, wherein the polymer electrolyte is a polyarylene ether sulfonic acid copolymer.

* * * * *